J. H. HANLEY, Jr., AND J. L. KRIEG.
FLUID HEATER.
APPLICATION FILED SEPT. 16, 1920.

1,397,282.

Patented Nov. 15, 1921.

Inventors
John H. Hanley, Jr.
and John L. Krieg,
by Meyers, Cavanagh & Hyde
Attorneys.

UNITED STATES PATENT OFFICE.

JOHN H. HANLEY, JR., AND JOHN L. KRIEG, OF NEW YORK, N. Y.

FLUID-HEATER.

1,397,282.    Specification of Letters Patent.    Patented Nov. 15, 1921.

Application filed September 16, 1920. Serial No. 410,591.

*To all whom it may concern:*

Be it known that we, JOHN H. HANLEY, Jr., and JOHN L. KRIEG, citizens of the United States, and residents of New York city, in the county of New York and State of New York, have invented certain new and useful Improvements in Fluid-Heaters, of which the following is a specification.

The invention relates to hot water heaters and particularly to those of the type wherein a suitable heating fluid is passed through a set of tubes in a water tank of sufficient capacity to accumulate and store a considerable quantity of hot water.

In the heaters of this class in commercial use at the present time, the cold water entering the tank does not always follow the natural path of circulation set up by convection. If water be drawn rapidly from the tank outlet, the cold water will frequently be short-circuited direct from inlet to outlet without following the desired circulation course along the heating element. Because the cold water does not come into contact with the heating element at all, or only into momentary contact with part of the heating element, it is insufficiently heated and issues from the tank in a cool state.

We have improved upon the construction of heater just described by providing means for confining the flow of water in the tank, caused by convection, to a definite and fixed path of circulation which absolutely prevents short-circuiting. The cold incoming water is compelled to flow along the radiating surfaces of the heating element before it can reach the tank outlet.

We also improve upon the known devices by providing means for automatically starting the flow of water in a cold heater tank in the desired direction, the instant heat is applied.

A still further advance in the art is made by our device in that the water entering the heater tank is prevented from impinging against the mud and other sediment which usually accumulates at the bottom of the tank. There is thus no stirring up of sediment and the hot water leaving the tank is consequently clear.

Other objects and advantages of the invention will be apparent from the following description, taken in connection with the accompanying drawings, in which.

Figure 1:
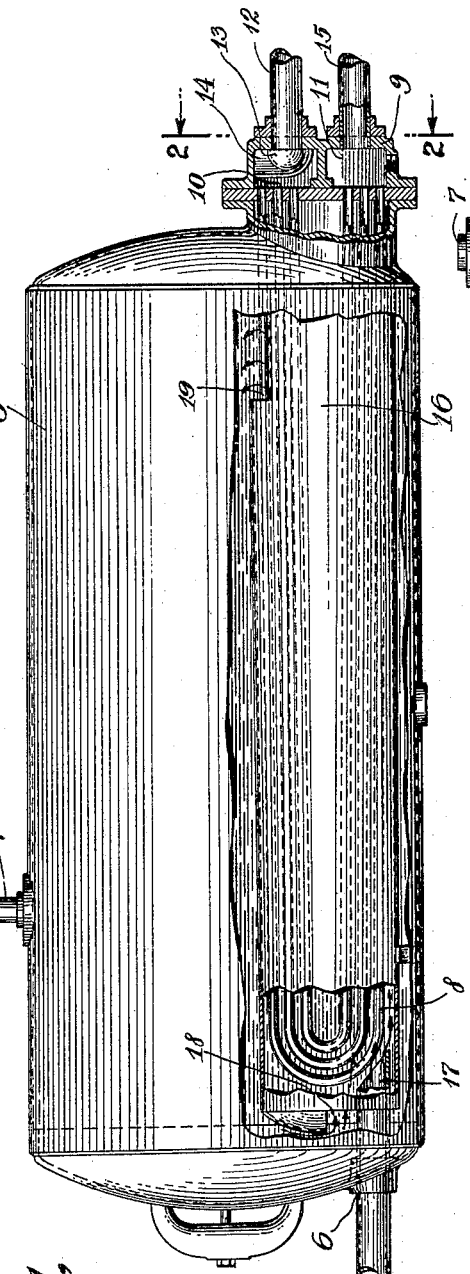
Figure 1 is a side elevation of a water heater constructed in accordance with the invention, parts of the structure being broken away to show the interior details.

The invention consists essentially of a storage tank 5 which may take the form shown in the drawings. It is here disclosed as a horizontally extending cylindrical tank having an inlet 6 for cold water and an outlet 7 for hot water, which are conveniently located near each other at one end of the tank. In order to heat the contents of the tank, a heating element like the one shown in the drawings may be used; but we do not restrict ourselves to any particular form of heating element. That disclosed in the present instance consists of a plurality of U-shaped tubes 8 which project longitudinally into the tank from a header 9. The header is shown as being divided into an inlet compartment 10 and an outlet compartment 11 situated below the level of the former. The U-tubes 8 extend from the compartment 10 to compartment 11, thus leading the heating fluid in a general downward direction through the heater tank. This causes the upper parts of the heating element, or those nearest the tube inlets, to be hotter than those parts more remote. Steam may be employed as the heating fluid. For instance low-pressure exhaust steam can be utilized in this way to serve a useful purpose. The heating fluid, whatever it may be, is introduced into the inlet compartment of the header through a conducting pipe. As it issues from the pipe 12, a deflector 13 projects the steam laterally against a second deflector 14, which in turn deflects the steam jet tangentially against the cylindrical inner surface of the header. The jet is thereby caused to take up a circular motion, and the resulting centrifugal force generated stratifies the steam and causes it to be distributed properly throughout the various tubes of the heating element. The spent steam leaves the outlet compartment 11 of the header through the pipe 15.

We have now reached the principal feature of the present invention. In order to prevent the cold water entering the tank through the inlet 6 from passing directly to the outlet 7 without passing along the heating element, as would be apt to occur in case of rapid discharge from the outlet, means are provided for guiding the incoming water in a definite circulation path along the heater. A guiding element in the form of the flue 16 shown in Fig. 1 is suitable for this purpose. It incloses the heating element and is supported in spaced relation to the bottom of the tank. As will be observed, the flue is directly interposed between the tank inlet and outlet.

Cold water from the inlet is directed into the flue by the nozzle 17 which projects through the enlarged inlet port 18. This port is larger than the nozzle and admits heated water from the upper levels of the tank around the sides of the nozzle. The nozzle is thus capable of drawing heated water into the flue like an injector. Water which has entered the flue can pass out through the outlet port 19 which is situated at the opposite end of the flue from the inlet port and preferably at a higher level. The flue is larger in diameter at its outlet end than at the inlet. It therefore diverges in the direction of flow of water through the flue. This divergence allows for increasing expansion of the water as its temperature rises during passage along the heating element.

The divergence in the flue has another function. It causes the water to start flowing in the proper direction when steam is first applied to a cold tank. The water will naturally seek the path of least resistance, which is the direction of increasing diameter of conducting flue.

The operation of the heater is as follows: Steam is turned on and the heating element applies heat to the water in the flue through radiation. The water commences to circulate in the direction of the arrows in Fig. 1. From the nozzle 17 the water from the inlet passes on through the flue in contact with the cooler, lower half of the heating element. Then the water rises through the outlet port 19, flows through the upper part of the tank to the inlet end, descends to the vicinity of the inlet nozzle, and enters the flue inlet port 18 to make a second trip through the flue. This time, the water is hotter and seeks the upper half of the flue as its channel. It therefore comes in contact with the upper portion of the heating element, which constantly increases in temperature as the port 19 is approached.

The water courses through the tank in this well-defined path of circulation by convection. The flue positively confines the cold water to this path and makes it come into perfect contact with the heating element in spite of any conditions which may arise. For instance, should hot water be drawn off rapidly from the tank outlet 7, the cold water cannot be short-circuited as in the heaters now in commercial use. It cannot move straight from tank inlet to tank outlet and dodge all or the major portion of the heating element. It cannot leave the path of natural circulation and issue cold from the tank outlet.

The diverging walls of the flue accommodate the increase in volume of the water and likewise lend impetus to the stream. The nozzle 17 and flue port 18 operate on the injector principle and aid convection in forcing the water faster and faster along its path of circulation.

Due to the fact that the cold incoming water enters the flue directly and does not rush along the bottom of the tank, the sediment in the bottom of the tank is not stirred up. The resulting advantage is a stream of constantly clear water from the tank outlet.

Figure 2:
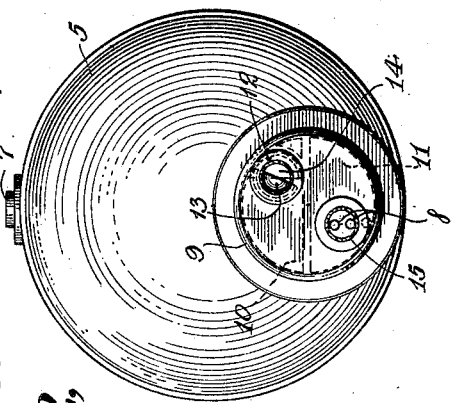
Fig. 2 is a vertical section on line 2—2 of Fig. 1.
Figure 3:
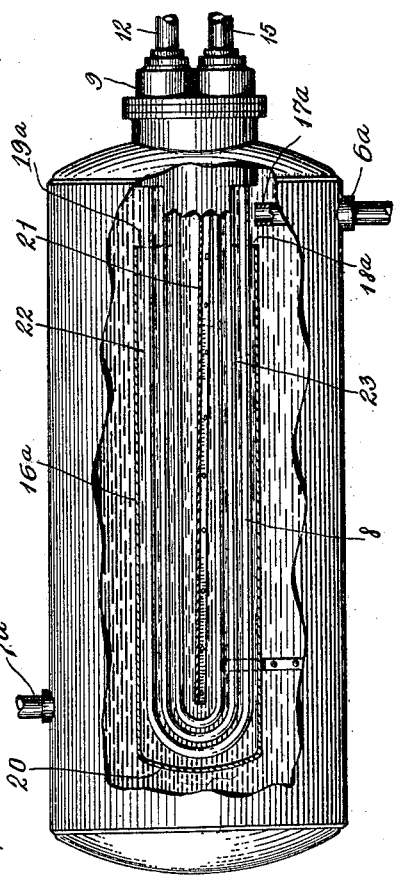
Fig. 3 is a view similar to Fig. 1 of a modified form of the device.

The inventive idea may be expressed in other constructional forms, such as that shown in Fig. 3. Here, the flue $16^a$ has the end farthest from the steam inlet closed by a head wall 20. A partition wall, or baffleplate, 21 extends from the head of the tank nearest the steam inlet to a point spaced from the head 20 of the flue and divides the latter into two legs, an upper leg 22 and a lower leg 23. The flue is thus U-shaped and has twice the effective length of the flue in Figs. 1 and 2. The partition wall 21 is inclined with respect to the axis of the flue, which causes the flue to diverge gradually from the inlet port $18^a$ to the outlet port $19^a$. The function for this divergence has already been discussed in connection with the primary embodiment of the invention. The ports $18^a$ and $19^a$ are both situated at the steam inlet end of the flue, one above the other. The tank inlet $6^a$ has a nozzle $17^a$ projecting into the flue inlet port $18^a$, whereas the tank outlet $7^a$ is disposed at the same relative position as in the preferred form of the device. The upper and lower portions, or legs, of the heating element conform in shape to the flue and fit within the same.

The principal advantage of this modified construction is positive control of the course of cold water from the tank inlet throughout a greatly increased distance.

It is to be understood that the invention is not limited to water heaters. Its principles may be applied to the heating of gas, vapor, or other fluids. Moreover, the construction described, while it embodies the preferred forms of our invention, is subject to many variations and modifications aside from those indicated, and we do not consider our invention to be limited to the construction shown, except as our invention is defined by the scope of the claims.

We claim:

1. In fluid heating apparatus, a tank having an inlet and an outlet for the fluid, a heating element occupying a restricted section of the tank, and means within the tank for guiding the fluid along said element along a predetermined path during its passage from the inlet to the outlet, said means also guiding fluid in the body of the tank along said element in the above mentioned path by convection in the absence of flow through said inlet.

2. In fluid heating apparatus, a tank having an inlet and an outlet for the fluid, a heating element occupying a restricted section of the tank, and means within the tank for guiding the fluid along said element along a predetermined path during its passage from the inlet to the outlet, said means including a wall enveloping said element, said means also guiding fluid in the body of the tank along said element in the above-mentioned path by convection in the absence of flow through said inlet.

3. In fluid heating apparatus, a tank having an inlet and an outlet for the fluid, a heating element occupying a restricted section of the tank, and means within the tank for guiding the fluid along said element during its passage from the inlet to the outlet, said means including a tubular flue enveloping said element and communicating adjacent its exit end with the interior of the tank.

4. In fluid heating apparatus, a tank having a fluid inlet, a tubular flue located in the tank and having a fluid passage therethrough connecting at one end with the body of the tank, the other end of said passage being positioned to receive directly fluid from said inlet, and a fluid heating element in the passage.

5. In fluid heating apparatus, a tank, and a fluid heating device located at a point substantially spaced from the top of the tank, said device including a flue having a continuous horizontal fluid passage therethrough, one end of the passage being substantially below the other; and a heating element located in said passage.

6. In fluid heating apparatus, a tank having an inlet and an outlet, and a fluid heating device located at a point substantially spaced from the top of the tank, said device including a flue having a continuous horizontal fluid passage therethrough, one end of the passage being substantially below the other; and a heating element located in said passage, the lower end of said passage being positioned to receive fluid directly from the inlet.

7. In fluid heating apparatus, a tank having an inlet and an outlet for the fluid, a flue within the tank having therein a continuous fluid passage with spaced ends, one end receiving fluid directly from the inlet, and a heating element in said passage adapted to direct a fluid heating medium therethrough in a direction opposite to the flow of fluid therein.

8. In fluid heating apparatus, a heating device adapted to be installed in a tank, including a tubular flue having a continuous fluid passage therethrough, one end of which is lower than the other when the flue is installed in horizontal position, and a heating element in said passage.

9. In fluid heating apparatus, a heating device adapted to be installed in a tank, including a tubular flue having a continuous fluid passage therethrough, one end of which is lower than the other when the flue is installed in horizontal position, and a heating element in said passage, including a plurality of heating tubes, the lower end of the passage being adapted to receive fluid from an inlet in the tank.

10. In fluid heating apparatus, a fluid heating device adapted to be installed within a tank, including a tubular flue having an inlet and an outlet, said flue increasing in size from the inlet to the outlet, and fluid heating means within the flue.

11. In fluid heating apparatus, a tank having an inlet and an outlet, a tapering flue disposed inside the tank and having an inlet port at its smaller end and an outlet port at its larger end in communication with the interior of the tank, means for directing fluid from the tank inlet into the flue through its inlet port, and means for heating the flue.

Signed at New York city, in the county of New York and State of New York, this 13th day of Sept., A. D. 1920.

JOHN H. HANLEY, Jr.
JOHN L. KRIEG.